US009333685B2

(12) United States Patent
Ong et al.

(10) Patent No.: US 9,333,685 B2
(45) Date of Patent: May 10, 2016

(54) APPARATUS AND SYSTEM FOR EXPANDING EXPANDABLE POLYMERIC MICROSPHERES

(71) Applicants: Construction Research and Technology GmbH, Trostberg (DE); Akzo Nobel Chemicals International B.V., Amersfoort (NL)

(72) Inventors: Frank Shaode Ong, Solon, OH (US); Stefan Muessig, Sagamore Hills, OH (US); Darren Gambatesa, Chagrin Falls, OH (US); James C. Smith, Cuyahoga Falls, OH (US); Rick Paponetti, Bedford, OH (US); Mark A. Bury, Middleburg Heights, OH (US); Fredrik Svensson, Alnö (SE); Jan Nordin, Kvissleby (SE); Jermaine Simmons, Duluth, GA (US)

(73) Assignee: AkzoNobel Chemicals International B.V., Trostberg (DE)

( * ) Notice: Subject to any disclaimer, the term of this patent is extended or adjusted under 35 U.S.C. 154(b) by 0 days.

(21) Appl. No.: 14/515,201

(22) Filed: Oct. 15, 2014

(65) Prior Publication Data

US 2015/0093468 A1    Apr. 2, 2015

Related U.S. Application Data

(63) Continuation of application No. PCT/US2013/037455, filed on Apr. 19, 2013, and a continuation-in-part of application No. 13/866,702, filed on Apr. 19, 2013.

(Continued)

(51) Int. Cl.
*B29C 44/34* (2006.01)
*C04B 20/06* (2006.01)
(Continued)

(52) U.S. Cl.
CPC ............. *B29C 44/3461* (2013.01); *C04B 20/06* (2013.01); *B29K 2101/12* (2013.01); *B29K 2105/048* (2013.01); *B29L 2031/756* (2013.01)

(58) Field of Classification Search
CPC .. B29C 44/3403; B29C 44/022; B29C 44/10; B29C 44/105; B29C 44/4361; B29C 44/3492; B29C 44/60
USPC .......................................................... 425/4 R
See application file for complete search history.

(56) References Cited

U.S. PATENT DOCUMENTS 2,361,297 A    10/1944    Kutsche
4,005,033 A    1/1977     Georgeau et al.
(Continued)

FOREIGN PATENT DOCUMENTS

DE          1 961 390         6/1971
DE     10 2006 009 842 A1     9/2007
(Continued)

OTHER PUBLICATIONS

PCT/EP2013/058155—International Search Report, Sep. 2, 2013.
(Continued)

*Primary Examiner* — Timothy Kennedy
(74) *Attorney, Agent, or Firm* — Curatolo Sidoti Co., LPA; Joseph G. Curatolo; Vincent A. Cortese

(57) ABSTRACT

An apparatus including: (a) a steam generator having a power output of less than or equal to about 6 boiler horsepower; (b) a steam conduit in fluid communication with the steam generator; (c) a fluid material conduit in fluid communication with a source of a fluid material, wherein the fluid material includes unexpanded, expandable polymeric microspheres; (d) a treatment zone in fluid communication with the steam generator via the steam conduit, and with the fluid material conduit, such that the fluid material is contacted by steam within the treatment zone; and (e) a back pressure generator in fluid communication with the treatment zone, capable of increasing pressure in the treatment zone, which results in expansion of the expandable polymeric microspheres when the fluid material exits the treatment zone.

19 Claims, 2 Drawing Sheets

Related U.S. Application Data

(60) Provisional application No. 61/790,312, filed on Mar. 15, 2013, provisional application No. 61/695,134, filed on Aug. 30, 2012, provisional application No. 61/635,562, filed on Apr. 19, 2012.

(51) Int. Cl.
    *B29L 31/00*     (2006.01)
    *B29K 101/12*     (2006.01)
    *B29K 105/04*     (2006.01)

(56) References Cited

U.S. PATENT DOCUMENTS

| | | |
|---|---|---|
| 4,057,526 A | 11/1977 | De Rook |
| 4,513,106 A | 4/1985 | Edgren et al. |
| 4,538,733 A | 9/1985 | Hoffman |
| 4,778,829 A | 10/1988 | Ichimura et al. |
| 5,016,689 A | 5/1991 | McGarvey et al. |
| 5,304,303 A | 4/1994 | Kozak, III |
| 6,084,011 A | 7/2000 | Lucero et al. |
| 7,543,642 B2 | 6/2009 | Reddy et al. |
| 2005/0274285 A1 | 12/2005 | Christensen et al. |
| 2005/0284340 A1 | 12/2005 | Vickers, Jr. et al. |
| 2007/0098973 A1 | 5/2007 | Wagner et al. |
| 2007/0137528 A1 | 6/2007 | Le Roy-Delage et al. |
| 2009/0093588 A1 | 4/2009 | Akutsu et al. |

FOREIGN PATENT DOCUMENTS

| | | |
|---|---|---|
| EP | 0 320 473 A1 | 6/1989 |
| EP | 0 950 699 A1 | 10/1999 |
| FR | 2072897 | 9/1971 |
| GB | 2 347 413 A | 9/2000 |
| JP | 01271225 A | 10/1989 |
| JP | 2005-254213 A | 9/2005 |
| WO | WO 03/051793 A2 | 6/2003 |
| WO | WO 2004/056549 A1 | 7/2004 |
| WO | WO 2006/133855 A2 | 12/2006 |
| WO | WO 2009/040359 A1 | 4/2009 |
| WO | WO 2010/070987 A1 | 6/2010 |

OTHER PUBLICATIONS

PCT/EP2013/058155—International Written Opinion, Sep. 2, 2013.
PCT/EP2013/037455—International Search Report, Sep. 2, 2013.
PCT/EP2013/037455—International Written Opinion, Sep. 2, 2013.
PCT/EP2013/058156—International Search Report, Sep. 2, 2013.
PCT/EP2013/058156—International Written Opinion, Sep. 2, 2013.
Moennig, et al., "Water saturated super-absorbent polymers used in high strength concrete", Otto-Graf-Journal: Annual Journal on Research and Testing of Materials, Jan. 1, 2005, vol. 16, pp. 193-202, Stuttgard, Germany.
International Preliminary Report on Patentability, mailed Oct. 30, 2014, for PCT International Patent Application No. PCT/EP2013/058155.
"Water-entrained cement-based materials II. Experimental observations" by Jensen, et al., Cement and Concrete Research, 32,2002,973-78.
European Search Report for European Patent Application No. 15152251.3, mailed Aug. 17, 2015.

APPARATUS AND SYSTEM FOR EXPANDING EXPANDABLE POLYMERIC MICROSPHERES

This application is a continuation application of International Application No. PCT/US2013/037455 filed on Apr. 19, 2013, and a continuation-in-part application of U.S. Ser. No. 13/866,702 filed on Apr. 19, 2014, both of which claim the benefit of the filing date under 35 U.S.C. §119(e) from U.S. Provisional Applications For Patent Ser. No. 61/790,312 filed on Mar. 15, 2013, Ser. No. 61/695,134 filed on Aug. 30, 2012, and Ser. No. 61/635,562 filed on Apr. 19, 2012.

Provided is an apparatus for expanding expandable polymeric microspheres.

Freeze-thaw cycles can be extremely damaging to water-saturated hardened cementitious compositions, such as concrete. The best known technique to prevent or reduce the damage done is the incorporation in the composition of microscopically fine pores or voids. The pores or voids function as internal expansion chambers and can therefore protect the composition from freeze-thaw damage by relieving changes in hydraulic pressure caused by freeze-thaw cycling. A conventional method used for producing such voids in cementitious compositions is by introducing air-entraining agents into the compositions, which stabilize tiny bubbles of air that are entrapped in the composition during mixing.

Unfortunately, this approach of producing air voids in cementitious compositions is plagued by a number of production and placement issues, some of which are the following:

Air Content: Changes in air content of the cementitious composition can result in a composition with poor resistance to freeze-thaw damage if the air content drops with time or reduce the compressive strength of the composition if the air content increases with time. Examples are pumping a cementitious composition (decreasing air content by compression), job-site addition of a superplasticizer (often elevates air content or destabilizes the air void system), and interaction of specific admixtures with the air-entraining surfactant (that could increase or decrease air content).

Air Void Stabilization: The inability to stabilize air bubbles may be caused by the presence of materials that adsorb the stabilizing surfactant, i.e., fly ash having high surface area carbon or insufficient water for the surfactant to work properly, i.e, low slump concrete.

Air Void Characteristics: Formation of bubbles that are too large to provide resistance to freezing and thawing damage may be the result of poor quality or poorly graded aggregates, use of other admixtures that destabilize the bubbles, etc. Such voids are often unstable and tend to float to the surface of the fresh concrete.

Overfinishing: Removal of air by overfinishing, removes air from the surface of the concrete, typically resulting in distress by scaling of the detrained zone of cement paste adjacent to the overfinished surface.

The generation and stabilization of air at the time of mixing and ensuring it remains at the appropriate amount and air void size until the cementitious composition hardens remain the largest day-to-day challenges for the cementitious composition producer in North America. The air content and the characteristics of the air void system entrained into the cementitious composition cannot be controlled by direct quantitative means, but only indirectly through the amount and/or type of air-entraining agent added to the composition.

Factors such as the composition and particle shape of the aggregates, the type and quantity of cement in the mix, the consistency of the cementitious composition, the type of mixer used, the mixing time, and the temperature all influence the performance of the air-entraining agent. The void size distribution in ordinary air-entrained concrete can show a very wide range of variation, between 10 and 3,000 micrometers ($\mu$m) or more. In such cementitious compositions, besides the small voids which are essential to cyclic freeze-thaw damage resistance, the presence of larger voids, which contribute little to the durability of the cementitious composition and could reduce the strength of the composition, has to be accepted as an unavoidable feature.

Air-entraining agents have been shown to provide resistance to freeze-thaw damage, as well as scaling damage resistance, which occurs when the surface of the hardened cementitious composition breaks away for any of a number of reasons, some of which are discussed above. However, because conventional air-entraining agents suffer from the problems discussed above, the cementitious composition industry is searching for new and better admixtures to provide the properties which are currently provided by conventional air-entraining agents.

A recent development is to use polymeric microspheres to create controlled-size voids within cementitious compositions. However, development is still ongoing to improve the function of polymeric microspheres within cementitious compositions, and to reduce the cost of including polymeric microspheres in cementitious compositions.

In order to provide appropriately sized air voids, polymeric microspheres may need to be expanded prior to incorporation into cementitious compositions. After expansion, expanded polymeric microspheres may have up to about 75 times the volume of the unexpanded microspheres. Providing cementitious composition admixtures which include expanded polymeric microspheres can be expensive, due to the high shipping cost associated with shipping an admixture which includes high-volume expanded microspheres, particularly if provided in an aqueous slurry which may include a volume of water.

Attempts have been previously made to find solutions to the problem identified above, namely the high shipping costs associated with providing expanded polymeric microspheres to end users. However, previous apparatus for expanding expandable polymeric microspheres consume large amounts of energy and are very large in size. It has now been surprisingly found that expandable polymeric microspheres may be adequately expanded using apparatus which consume much less energy and are significantly smaller in size.

For example, in certain previous apparatus utilized in expanding expandable polymeric microspheres, steam generators capable of providing at least 30 boiler horsepower have been used. The present apparatus utilizes a steam generator having a power output of less than or equal to about 6 boiler horsepower to adequately expand the expandable polymeric microspheres. This results in increased energy efficiency, lower costs, and an apparatus which is smaller in size, or footprint, than previous expansion apparatus.

What is needed is a means for delivering expanded polymeric microspheres to end users in a cost-effective manner.

Embodiments of the subject matter are disclosed with reference to the accompanying drawings and are for illustrative purposes only. The subject matter is not limited in its application to the details of construction or the arrangement of the components illustrated in the drawings. Like reference numerals are used to indicate like components, unless otherwise indicated.

Figure 1:
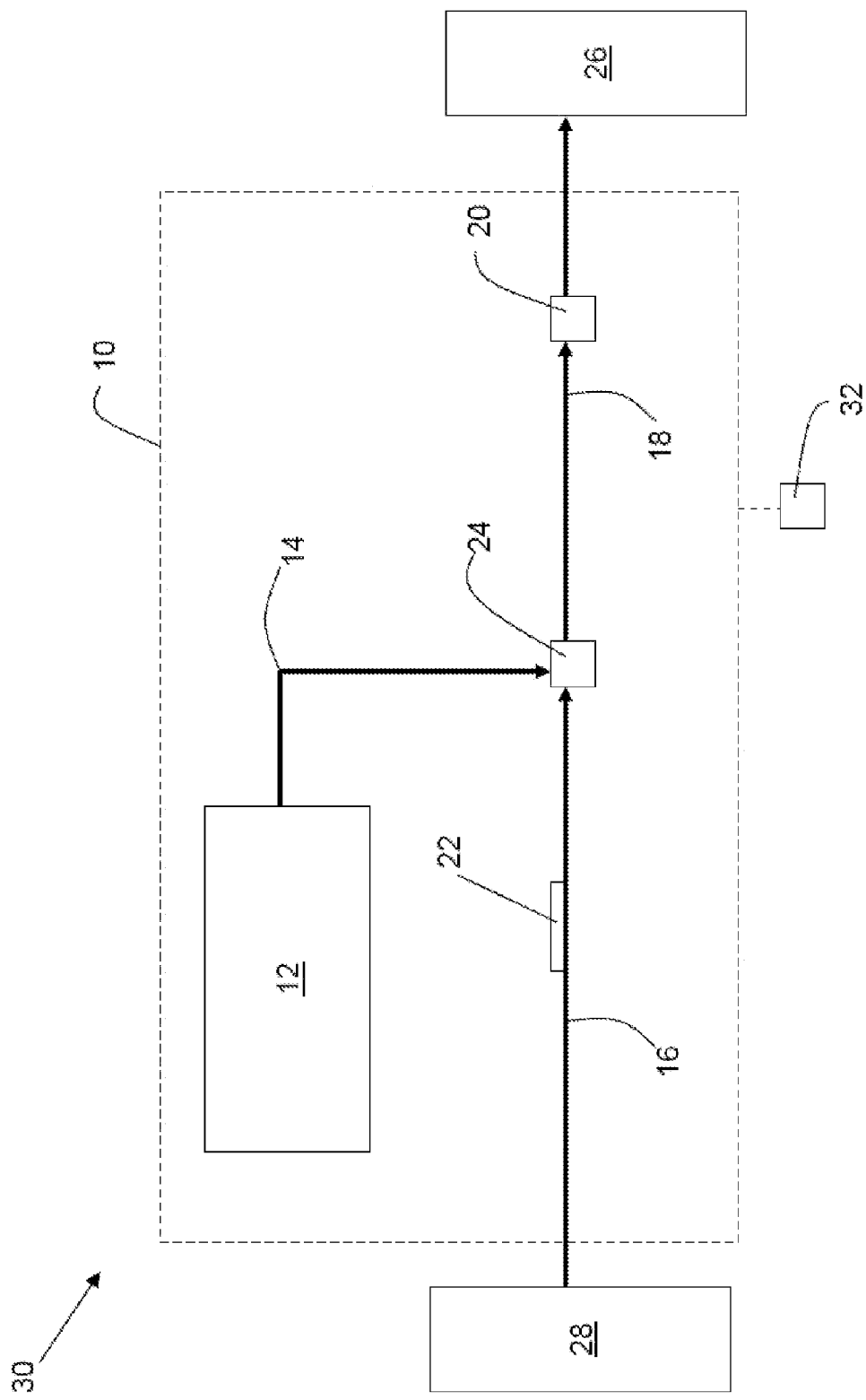
FIG. 1 is a schematic flowchart depicting one embodiment of the present subject matter.

Provided is an apparatus comprising: (a) a steam generator having a power output of less than or equal to about 6 boiler horsepower; (b) a steam conduit in fluid communication with the steam generator; (c) a fluid material conduit in fluid communication with a source of a fluid material, wherein the fluid material comprises unexpanded, expandable polymeric microspheres; (d) a treatment zone in fluid communication with the steam generator via the steam conduit, and with the fluid material conduit, such that the fluid material is contacted by steam within the treatment zone; and (e) a back pressure generator in fluid communication with the treatment zone, capable of increasing pressure in the treatment zone, which results in expansion of the expandable polymeric microspheres when the fluid material exits the treatment zone. Boiler horsepower is a unit used to rate the power output of steam generators, and 1 boiler horsepower is equivalent to 13.15 horsepower, 9,809.5 watts and 34.5 pounds of water evaporated per hour at 212° F.

When referring to a steam generator having a power output of less than or equal to about 6 boiler horsepower, what is meant is at least one of: (i) a steam boiler dedicated to the apparatus, having a power output of less than or equal to about 6 boiler horsepower; or (ii) another source of steam which provides less than or equal to about 6 boiler horsepower to the apparatus. There may be steam generators already present in certain manufacturing facilities in which the apparatus may be placed. In these instances, it may be possible to utilize the existing steam boilers in order to provide steam to the present apparatus.

While expandable polymeric microspheres are discussed herein with regard to use in cementitious compositions, the present apparatus is not limited to providing expanded polymeric microspheres for use in cementitious compositions. Rather, the present apparatus may be used to provide expanded polymeric microspheres for use in any products of manufacture in which expanded polymeric microspheres may be included.

In certain embodiments, the apparatus may consume less than or equal to about 70 kW during steady-state operation. In certain embodiments, the apparatus may consume less than or equal to about 60 kW during steady-state operation. In certain embodiments, the apparatus may consume less than or equal to about 50 kW during steady-state operation. In certain embodiments, the apparatus may consume less than or equal to about 45 kW during steady-state operation.

In certain embodiments, the apparatus may be capable of expanding from about 0.1 gal/min to about 3 gal/min (from about 0.5 L/min to about 14 L/min) of the fluid material comprising unexpanded, expandable polymeric microspheres during steady-state operation. In certain embodiments, the apparatus may be capable of producing from about 0.2 gal/min to about 2 gal/min (from about 0.9 L/min to about 9 L/min) of the fluid material comprising unexpanded, expandable polymeric microspheres during steady-state operation. In certain embodiments, the apparatus may be capable of producing from about 0.4 gal/min to about 1 gal/min (from about 1.8 L/min to about 5 L/min) of the fluid material comprising unexpanded, expandable polymeric microspheres during steady-state operation.

In certain embodiments, the fluid material comprising unexpanded, expandable polymeric microspheres may comprise from about 1% to about 50% by volume of unexpanded, expandable polymeric microspheres. In certain embodiments, the fluid material comprising unexpanded, expandable polymeric microspheres may comprise from about 5% to about 40% by volume of unexpanded, expandable polymeric microspheres. In certain embodiments, the fluid material comprising unexpanded, expandable polymeric microspheres may comprise from about 10% to about 30% by volume of unexpanded, expandable polymeric microspheres.

Without wishing to be limited by theory, the function of the apparatus may be described as follows. A fluid material comprising unexpanded, expandable polymeric microspheres may include water (and/or other suitable fluid(s)) and the unexpanded, expandable polymeric microspheres, and may also include other admixtures for cementitious compositions, if the expanded polymeric microspheres will be used in a cementitious composition. The fluid material comprising the unexpanded, expandable polymeric microspheres is contacted with steam within the treatment zone, such that the unexpanded, expandable polymeric microspheres are subjected to increased temperature, which results in expansion of the expandable polymeric microspheres. In certain embodiments, the expandable polymeric microspheres may also be subjected to increased pressure within the treatment zone, and upon exiting the treatment zone, optionally via the back pressure generator, the expandable polymeric microspheres may experience a pressure drop equal to the difference between the pressure in the treatment zone and the pressure in the environment outside the treatment zone. This decrease in pressure may result in further expansion of the expandable polymeric microspheres.

In certain embodiments, the temperature inside the treatment zone may be from about 80° C. (176° F.) to about 160° C. (320° F.), in certain embodiments from about 100° C. (212° F.) to about 160° C. (320° F.), in certain embodiments from about 105° C. (221° F.) to about 145° C. (293° F.), in certain embodiments from about 135° C. (275° F.) to about 145° C. (293° F.). In certain embodiments, the pressure inside the treatment zone may be from about 46.1 kPa (6.69 psi) to about 618.1 kPa (89.65 psi), in certain embodiments from about 101.3 kPa (14.69 psi) to about 618.1 kPa (89.65 psi), in certain embodiments from about 120 kPa (17.4 psi) to about 420 kPa (60.9 psi), in certain embodiments from about 315 kPa (45.7 psi) to about 420 kPa (60.9 psi).

In certain embodiments, the fluid material conduit may comprise a particle dispersing device at the end of the fluid material conduit proximate to the junction between the fluid material conduit and the steam conduit. The particle dispersing device acts to separate the unexpanded, expandable polymeric microspheres, in order to increase the amount of surface area of unexpanded, expandable polymeric microspheres which is contacted with steam. In certain embodiments, the particle dispersing device may be a nozzle.

The fluid material comprising the expanded, expandable polymeric microspheres may then be added to or mixed with process water or other liquid admixtures, and then incorporated into a cementitious composition or other product of manufacture. Alternatively, the fluid material comprising the expanded, expandable polymeric microspheres may be incorporated directly into a cementitious composition (before or during mixing of the cementitious composition) or other product of manufacture without first adding the fluid material to process water or other liquid admixtures.

The back pressure generator is capable of restricting and/or controlling the flow of the fluid material and steam through the treatment zone, to ensure that the temperature within the treatment zone is sufficient to allow the expandable polymeric microspheres to expand to a desired degree. In certain embodiments, the back pressure generator may also provide increased pressure within the treatment zone, in order to allow further expansion of the expandable polymeric microspheres, if the expandable polymeric microspheres experience a pressure drop upon exiting the treatment zone. The back pressure generator may comprise, for example, a flow control valve or a flow restriction device, such as an orifice nozzle. Alternatively or additionally, in certain embodiments, the back pressure generator may comprise: (i) a length of conduit sufficient to impede flow through the treatment zone, such that the temperature and/or pressure inside the treatment zone are maintained or increased; and/or (ii) a conduit which has an interior size which is smaller than the interior size of either or both of the fluid material conduit or the steam conduit, such that the temperature and/or pressure inside the treatment zone are maintained or increased; and/or (iii) a conduit which has an irregular interior wall pattern, such as a rifled conduit, such that the temperature and/or pressure inside the treatment zone are maintained or increased.

In certain embodiments, the apparatus has a footprint which allows the apparatus to be placed inside a manufacturing facility which uses the expanded expandable polymeric microspheres in products of manufacture without substantially adversely affecting production of the products of manufacture. As used herein, the term "footprint" means the horizontal area of the apparatus, e.g., the floor space consumed by the apparatus when placed inside a manufacturing facility. For example, the apparatus may be placed inside an existing cementitious composition manufacturing facility without substantially affecting production of the cementitious composition and without requiring adding space to the manufacturing facility. Similar arrangements are possible in manufacturing facilities which produce other products. The footprint of the apparatus may be less than or equal to about 60 ft$^2$ in some embodiments.

In certain embodiments, it may be desirable to allow the expanded, expandable polymeric microspheres to achieve a shell stabilized condition after leaving the treatment zone, prior to incorporating the expanded, expandable polymeric microspheres into water and/or a cementitious composition. It is possible that injecting the expanded, expandable polymeric microspheres directly into water and/or a cementitious composition may cause the microspheres to deform, which may be undesirable when utilizing the microspheres in certain products of manufacture. By "shell stabilized condition", it is meant the condition at which the expanded, expandable polymeric microspheres will no longer deform, after being expanded by the expansion process.

Without wishing to be limited by theory, it is believed that microsphere deformation may be caused by at least partial reliquification of the blowing agent used to expand the expandable polymeric microspheres. The at least partial reliquification of the blowing agent may result in negative pressure inside the expanded, expandable polymeric microspheres. In order to avoid microsphere deformation in these conditions, it is necessary to allow the pressure inside the expanded microspheres to equilibrate to the pressure of the environment external to the microspheres. This may be accomplished by allowing a gas, such as air, to penetrate the microspheres to equilibrate the pressure inside the microspheres to offset the decrease in pressure caused by the at least partial reliquification of the blowing agent.

Allowing the expanded, expandable polymeric microspheres to achieve a shell stabilized condition may be accomplished by utilizing a chamber in fluid communication with the outlet end of the treatment zone, wherein the chamber provides sufficient cooling and residence time to allow the expanded microspheres to achieve the shell stabilized condition in order to prevent deformation of the expanded microspheres. In certain embodiments, any suitable fluid, such as air, may be fed to the inlet of the chamber in order to cool the expanded, expandable polymeric microspheres to the shell stabilized condition. In certain embodiments, the outlet end of the chamber may be in fluid communication with a vessel which collects the expanded, expandable polymeric microspheres, and the vessel may optionally include a volume of water into which the microspheres may be dispersed. In certain embodiments, the chamber may comprise a length of conduit, such as a pipe or a hose.

In certain embodiments, the apparatus may be supplied with sources of water and electricity provided by a manufacturing facility in which the apparatus may be placed. Aside from utilizing water and electricity provided by the manufacturing facility, the apparatus may not otherwise significantly affect the operation and/or efficiency of the manufacturing facility, in that the apparatus may be placed in an unobtrusive location within the facility such that the work flow in the facility need not be substantially altered to accommodate the apparatus.

The expanded polymeric microspheres provide void spaces in cementitious compositions prior to final setting, and such void spaces act to increase the freeze-thaw durability of the cementitious material. Expanded polymeric microspheres introduce voids into cementitious compositions to produce a fully formed void structure in cementitious compositions which resists concrete degradation produced by water-saturated cyclic freezing and does not rely on air bubble stabilization during mixing of cementitious compositions. The freeze-thaw durability enhancement produced with the expanded polymeric microspheres is based on a physical mechanism for relieving stresses produced when water freezes in a cementitious material. In conventional practice, properly sized and spaced voids are generated in the hardened material by using chemical admixtures to stabilize the air voids entrained into a cementitious composition during mixing. In conventional cementitious compositions these chemical admixtures as a class are called air entraining agents. Use of expanded polymeric microspheres to form a void structure in cementitious compositions does not require the production and/or stabilization of air that has been entrained during the mixing process.

The use of expanded polymeric microspheres substantially eliminates some of the practical problems encountered in the current art. It also makes it possible to use some materials, i.e., low grade, high-carbon fly ash, which may be landfilled because it is considered unusable in air-entrained cementitious compositions without further treatment. This results in cement savings, and therefore economic savings. As the voids "created" by this approach are much smaller than those obtained by conventional air-entraining agents, the volume of expanded polymeric microspheres that is required to achieve the desired durability is also much lower than in conventional air entrained cementitious compositions. Therefore, a higher compressive strength can be achieved at the same level of protection against freezing and thawing damage. Consequently, the most expensive component used to achieve strength, i.e., cement, can be saved.

Expandable microspheres and expanded microspheres produced using the subject apparatus may be useful in various applications such as paper making, printing inks, putties, sealants, toy-clays, underbody coatings, adhesives, debonding of adhesives, artificial leather, genuine leather, paint, nonwoven materials, paper and board, coatings for various materials such as paper, board, plastics, metals and textile, explosives, cable insulations, thermoplastics (such as polyethylene, polyvinyl chloride, and ethylene-vinylacetate) or thermoplastic elastomers (such as styrene-ethylene-butylene-styrene co-polymer, styrene-butadiene-styrene co-polymer, thermoplastic polyurethanes and thermoplastic polyolefins), styrene-butadiene rubber, natural rubber, vulcanized rubber, silicone rubbers, thermosetting polymers (such as epoxies, polyurethanes and polyesters).

Expanded microspheres may also be used in applications such as putties, sealants, toy-clays, genuine leather, paint, explosives, cable insulations and thermosetting polymers (like epoxies, polyurethanes and polyesters). In some cases it may be possible to use a mixture of expanded and expandable microspheres, for example in underbody coatings, silicone rubbers and light weight foams.

The expandable polymeric microspheres may be comprised of a polymer that is at least one of polyethylene, polypropylene, polymethyl methacrylate, poly-o-chlorostyrene, polyvinyl chloride, polyvinylidene chloride, polyacrylonitrile, polymethacrylonitrile, polystyrene, and copolymers thereof, such as copolymers of vinylidene chloride-acrylonitrile, polyacrylonitrile-copolymethacrylonitrile, polyvinylidene chloride-polyacrylonitrile, or vinyl chloride-vinylidene chloride, and the like. As the microspheres are composed of polymers, the wall may be flexible, such that it moves in response to pressure. The material from which the microspheres are to be made, therefore, may be flexible, and, in certain embodiments, resistant to the alkaline environment of cementitious compositions. Without limitation, suitable expandable polymeric microspheres are available from Akzo Nobel Pulp and Performance Chemicals, Inc. (Duluth, Ga.), an AkzoNobel company, under the trade name EXPANCEL®.

In certain embodiments, the unexpanded, expandable polymeric microspheres may have an average diameter of about 100 µm or less, in certain embodiments about 50 µm or less, in certain embodiments about 24 µm or less, in certain embodiments about 16 µm or less, in certain embodiments about 15 µm or less, in certain embodiments about 10 µm or less, and in other embodiments about 9 µm or less. In certain embodiments, the average diameter of the unexpanded polymeric microspheres may be from about 10 µm to about 16 µm, in certain embodiments from about 6 µm to about 9 µm, in certain embodiments from about 3 µm to about 6 µm, in certain embodiments from about 9 µm to about 15 µm, and in other embodiments from about 10 µm to about 24 µm. The polymeric microspheres may have a hollow core and compressible wall. The interior portion of the polymeric microspheres comprises a void cavity or cavities that may contain gas (gas filled) or liquid (liquid filled).

In certain embodiments, the expanded, expandable polymeric microspheres may have an average diameter of about 200 to about 900 µm, in certain embodiments, about 40 to about 216 µm, in certain embodiments about 36 to about 135 µm, in certain embodiments about 24 to about 81 µm, and in certain embodiments about 12 to about 54 µm.

The diameters expressed above are volume-average diameters. The diameter of the unexpanded and/or expanded, expandable polymeric microspheres may be determined by any method which is known in the art. For example, the volume-average diameter of the expandable polymeric microspheres may be determined by a light-scattering technique, such as by utilizing a light scattering device available from Malvern Instruments Ltd (Worcestershire, UK).

It has been found that the smaller the diameter of the expandable polymeric microspheres, the smaller the amount of the microspheres that is required to achieve the desired freeze-thaw damage resistance in cementitious compositions. This is beneficial from a performance perspective, in that a smaller decrease in compressive strength occurs by the addition of the microspheres, as well as an economic perspective, since a smaller amount of spheres is required. Similarly, the wall thickness of the polymeric microspheres may be optimized to minimize material cost, but to ensure that the wall thickness is adequate to resist damage and/or fracture during mixing, placing, consolidating and finishing processes of the cementitious composition.

In certain embodiments, the apparatus further comprises a control device to manually and/or automatically control the function of the apparatus. The control device may comprise, for example, a bank of mechanical controls which operate the apparatus. The control device may alternatively or additionally comprise a processer. For example, the control device may be a computer including a processor and display, which would allow an operator to electronically control the device via the display and processor. In certain embodiments, the control device may include a programmable logic controller, a human machine interface display device, and various mechanical controls which may be operated by the programmable logic controller, such that a human will be able to manually and/or automatically control the apparatus through the human machine interface display device and programmable logic controller.

The control device may also be capable of communicating with a master control device which controls one or more other apparatus or functions within a manufacturing facility, such that the master control device is capable of controlling the control device of the apparatus. In this manner, the apparatus may be capable of being controlled automatically by the master control device in order to provide expanded expandable polymeric microspheres during production of products of manufacture in the manufacturing facility.

In certain embodiments, the apparatus may further comprise a manual and/or automatic site gauge engaged with the fluid material conduit. In circumstances in which the expanded, expandable polymeric microspheres will be used in products of manufacture which are subject to government regulation, it may be necessary to verify the contents of the fluid material during operation of the apparatus. For example, if the expanded microspheres are to be used in a cementitious composition, it may be necessary to verify the amount of expandable microspheres in the fluid material, prior to incorporation in the cementitious composition, in order to satisfy certain government regulations dictating the amount of expanded microspheres required to provide a certain level of protection against freeze-thaw damage.

The site gauge may be viewed manually, such as by an operator looking through the site gauge to verify the presence of expandable polymeric microspheres in the fluid material. Alternatively or additionally, the site gauge may be operated automatically, such as by an automated ball valve which redirects a portion of the fluid material into a glass vial for inspection. In certain embodiments, the site gauge may also include an outlet so that a portion of the fluid material may be removed for analysis.

In certain embodiments, the inside diameter of the fluid material conduit may be from about 0.2 to about 1.5 inches (from about 0.5 to about 3.8 cm). In certain embodiments, the treatment zone may comprise a treatment conduit. The inside diameter of the treatment conduit may be from about 0.1 to about 0.75 inches (from about 0.25 to about 1.9 cm). In certain embodiments, the inside diameter of the fluid material conduit and/or the treatment conduit may be dependent upon the desired flow rate of the fluid material and the power output of the steam generator. In certain embodiments, the inside diameter of the treatment conduit may be about half the inside diameter of the fluid material conduit.

In certain embodiments, the steam conduit and the fluid material conduit may be joined via a conduit junction proximate to an inlet end of the treatment zone or treatment conduit. For example, the steam conduit and the fluid material conduit may be joined via a conduit junction engaged with an inlet end of the treatment zone or treatment conduit. In certain embodiments, the back pressure generator may be engaged with an outlet end of the treatment zone or treatment conduit.

In certain embodiments, the apparatus further comprises: (f) a control device to manually and/or automatically control the function of the apparatus; and (g) a manual and/or automatic site gauge engaged with the fluid material conduit; wherein: (i) the treatment zone comprises a treatment conduit; (ii) the steam conduit and the fluid material conduit converge via a conduit junction engaged with an inlet end of the treatment conduit; and (iii) the back pressure generator is engaged with an outlet end of the treatment conduit.

In certain embodiments, provided is a system for providing expanded polymeric microspheres comprising the apparatus described above and at least one batch tank to receive the expanded expandable polymeric microspheres. In certain embodiments, the system may comprise a plurality of batch tanks to receive the expanded polymeric microspheres. The batch tank(s) may be used to temporarily store the expanded polymeric microspheres prior to use in products of manufacture. In certain embodiments, the batch tank(s) may comprise at least one mixing device in order to maintain a uniform suspension of the expanded, expandable polymeric microspheres residing in the batch tank(s). Providing a plurality of batch tanks may increase the efficiency of the system, in that the apparatus may be run constantly for a period of time in order to fill all of the plurality of batch tanks with expanded polymeric microspheres for later use in products of manufacture. In this way, the apparatus would not have to be started and stopped each time expanded polymeric microspheres are needed, avoiding multiple apparatus starting operations, which may require additional energy in order to start the apparatus numerous times.

In certain embodiments, the source of the fluid material is not a part of the apparatus. For example, the source of the fluid material may be at least one fluid material vessel proximate or remote to the apparatus, which can be adapted to be in fluid communication with the fluid material conduit. A specific non-limiting example is a fluid material vessel connected to the apparatus via a removable conduit engaged with the fluid material conduit.

In certain embodiments, provided is a system for providing expanded polymeric microspheres comprising the apparatus described above and at least one fluid material vessel in fluid communication with the fluid material conduit.

Also provided is a system for providing expanded polymeric microspheres comprising: (i) an apparatus for expanding a fluid material comprising unexpanded, expandable polymeric microspheres, the apparatus comprising: (a) a steam generator having a power output of less than or equal to about 6 boiler horsepower; (b) a steam conduit in fluid communication with the steam generator; (c) a fluid material conduit in fluid communication with a source of the fluid material; (d) a treatment zone in fluid communication with the steam generator via the steam conduit, and with the fluid material conduit, such that the fluid material is contacted by steam within the treatment zone; and (e) a back pressure generator in fluid communication with the treatment zone, capable of increasing pressure in the treatment zone, which results in expansion of the expandable polymeric microspheres when the fluid material exits the treatment zone; (ii) at least one fluid material vessel in fluid communication with the fluid material conduit; and (iii) at least one batch tank to receive the expanded expandable polymeric microspheres. In certain embodiments, the system may further comprise a site gauge engaged with the fluid material conduit. In certain embodiments, the system may comprise a plurality of batch tanks to receive the expanded polymeric microspheres. In certain embodiments, the at least one batch tank may comprise at least one mixing device.

FIG. 1 depicts embodiments of the apparatus and systems described herein. Apparatus 10 comprises a steam generator 12 in fluid communication with a steam conduit 14, which is in turn in fluid communication with a conduit junction 24. A fluid material conduit 16, optionally including a site gauge 22 engaged therewith, is in fluid communication with the conduit junction 24. The conduit junction 24 is proximate to or engaged with an inlet end of a treatment zone 18. A back pressure generator 20 is engaged with an outlet end of the treatment zone 18. The apparatus may be a part of a system 30 which includes at least one batch tank 26 in fluid communication with the treatment zone 18 and at least one fluid material vessel 28 in fluid communication with the fluid material conduit 16. A control device 32 may be in electronic communication with any number of the items which make up the apparatus 10, and may additionally control aspects of the system 30.

Figure 2:
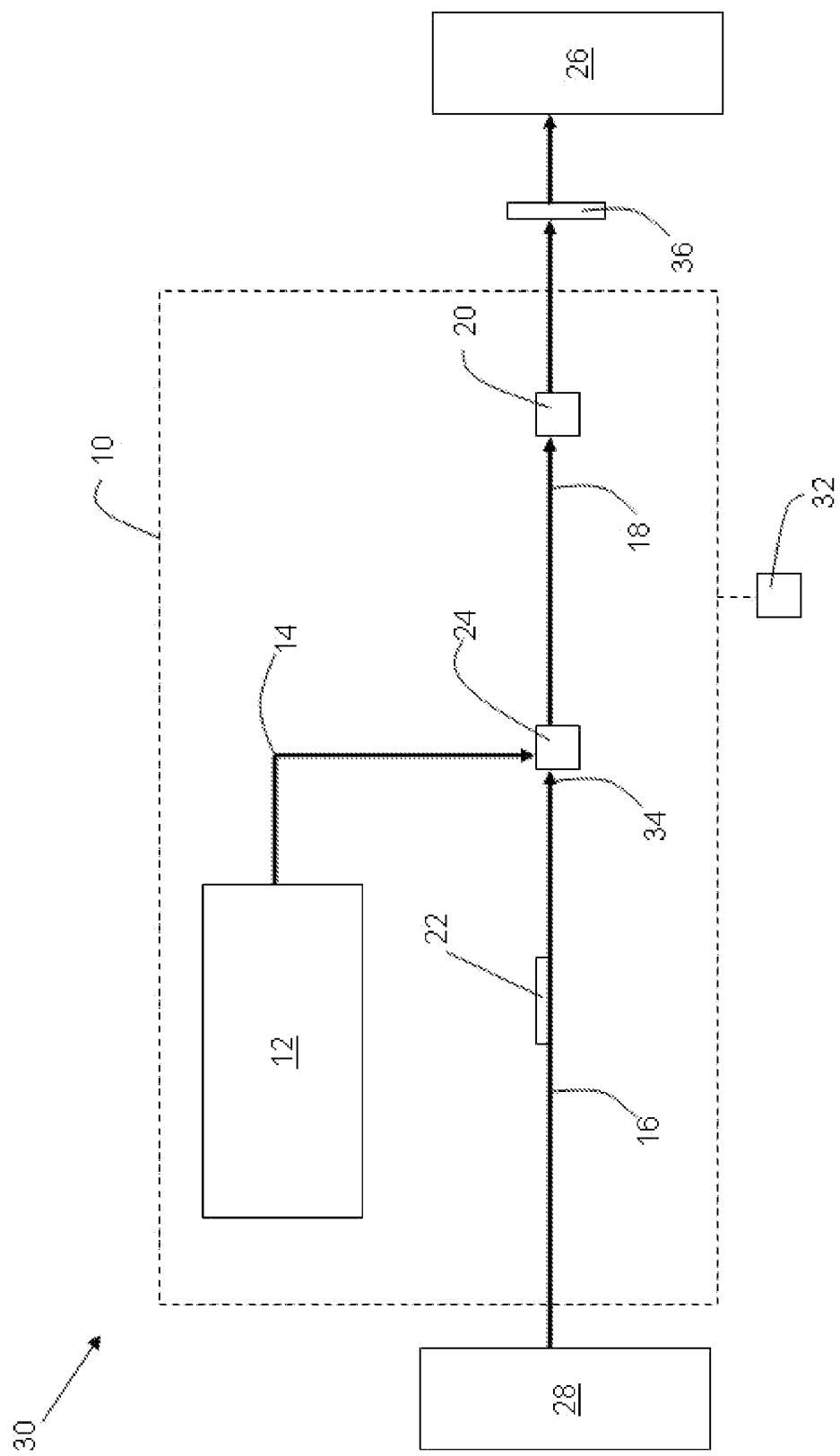
FIG. 2 is a schematic flowchart depicting a second embodiment of the present subject matter.

FIG. 2 depicts embodiments of the apparatus and systems described herein. Apparatus 10 comprises a steam generator 12 in fluid communication with a steam conduit 14, which is in turn in fluid communication with a conduit junction 24. A fluid material conduit 16, optionally including a site gauge 22 engaged therewith, is in fluid communication with the conduit junction 24. The conduit junction 24 is proximate to or engaged with an inlet end of a treatment zone 18. The fluid material conduit optionally includes a particle dispersing device 34 at the end of the fluid material conduit prozimate to the conduit junction 24. A back pressure generator 20 is engaged with an outlet end of the treatment zone 18. The apparatus may be a part of a system 30 which includes at least one batch tank 26 in fluid communication with the treatment zone 18 and at least one fluid material vessel 28 in fluid communication with the fluid material conduit 16. The system 30 may include a chamber 36 for allowing the expanded, expandable polymeric microspheres to achieve a shell stabilized condition. A control device 32 may be in electronic communication with any number of the items which make up the apparatus 10, and may additionally control aspects of the system 30.

The following example is set forth merely to further illustrate the subject apparatus and systems. The illustrative examples should not be construed as limiting the apparatus or systems in any manner.

A dispersion of unexpanded, expandable polymeric microspheres in water is provided to a fluid material conduit 16. A steam generator 12 having a power output of less than or equal to about 6 boiler horsepower produces steam, which is provided to a steam conduit 14. The fluid material conduit 16 and the steam material conduit 14 meet at a T junction 24 and enter the treatment zone 18. Inside the treatment zone 18, the steam heats and pressurizes the microsphere dispersion, causing a small amount of expansion of the microspheres and softening the shell of the microspheres. A backpressure generator 20 in the form of an orifice nozzle is engaged with the outlet end of the treatment zone 18, increasing the pressure in the treatment zone 18. The microsphere dispersion passes through the backpressure generator 20 and experiences a pressure drop equal to the difference between the pressure inside the treatment zone 18 and the pressure in the environment outside the treatment zone. The pressure drop causes the microspheres to expand. The microspheres are then either immediately used in a product of manufacture, such as a cementitious composition, or are stored for later use.

In a first embodiment, a subject apparatus may comprise: (a) a steam generator having a power output of less than or equal to about 6 boiler horsepower; (b) a steam conduit in fluid communication with the steam generator; (c) a fluid material conduit in fluid communication with a source of a fluid material, wherein the fluid material comprises unexpanded, expandable polymeric microspheres; (d) a treatment zone in fluid communication with the steam generator via the steam conduit, and with the fluid material conduit, such that the fluid material is contacted by steam within the treatment zone; and (e) a back pressure generator in fluid communication with the treatment zone, capable of increasing pressure in the treatment zone, which results in expansion of the expandable polymeric microspheres when the fluid material exits the treatment zone.

The apparatus of the first embodiment may further include that the apparatus consumes less than or equal to about 70 kw, optionally less than or equal to about 60 kW, optionally less than or equal to about 50 kW, optionally less than or equal to about 45 kW, during steady-state operation.

The apparatus of either or both of the first or subsequent embodiments may further include that the apparatus is capable of expanding from about 0.1 gal/min to about 3 gal/min of the fluid material comprising unexpanded, expandable polymeric microspheres during steady-state operation, optionally from about 0.2 gal/min to about 2 gal/min of the fluid material comprising unexpanded, expandable polymeric microspheres during steady-state operation, optionally from about 0.4 gal/min to about 1 gal/min of the fluid material comprising unexpanded, expandable polymeric microspheres during steady-state operation.

The apparatus of any of the first or subsequent embodiments may further include that the fluid material comprises from about 1% to about 50% by volume of unexpanded, expandable polymeric microspheres, optionally from about 5% to about 40% by volume of unexpanded, expandable polymeric microspheres, optionally from about 10% to about 30% by volume of unexpanded, expandable polymeric microspheres.

The apparatus of any of the first or subsequent embodiments may further include that the apparatus has a footprint which allows the apparatus to be placed inside a manufacturing facility which uses the expanded expandable polymeric microspheres in products of manufacture without substantially affecting production of the products of manufacture. The footprint of the apparatus may be less than or equal to about 60 ft$^2$.

The apparatus of any of the first or subsequent embodiments may further comprise a control device to manually and/or automatically control the function of the apparatus. The control device may comprise a processor.

The apparatus of any of the first or subsequent embodiments may further comprise a manual and/or automatic site gauge engaged with the fluid material conduit.

The apparatus of any of the first or subsequent embodiments may further include that the inside diameter of the fluid material conduit may be from about 0.2 to about 1.5 inches.

The apparatus of any of the first or subsequent embodiments may further include that the treatment zone comprises a treatment conduit. The steam conduit and the fluid material conduit may be joined via a conduit junction proximate to an inlet end of the treatment conduit. The steam conduit and the fluid material conduit may be joined via a conduit junction engaged with an inlet end of the treatment conduit. The back pressure generator may engaged with an outlet end of the treatment conduit. The inside diameter of the treatment conduit may be from about 0.1 to about 0.75 inches. The inside diameter of the treatment conduit may be about half the inside diameter of the fluid material conduit.

The apparatus of any of the first or subsequent embodiments may further include that the temperature inside the treatment zone is from about 80° C. to about 160° C., optionally from about 100° C. to about 160° C., further optionally from about 105° C. to about 145° C., further optionally from about 135° C. to about 145° C.

The apparatus of any of the first or subsequent embodiments may further include that the pressure inside the treatment zone is from about 46.1 kPa to about 618.1 kPa, optionally from about 101.3 kPa to about 618.1 kPa, further optionally from about 120 kPa to about 420 kPa, further optionally from about 315 kPa to about 420 kPa.

The apparatus of any of the first or subsequent embodiments may further include that the fluid material conduit comprises a particle dispersing device at the end of the fluid material conduit proximate to the junction between the fluid material conduit and the steam conduit.

The apparatus of any of the first or subsequent embodiments may further comprise: (f) a control device to manually and/or automatically control the function of the apparatus; and (g) a manual and/or automatic site gauge engaged with the fluid material conduit; wherein: (i) the treatment zone comprises a treatment conduit; (ii) the steam conduit and the fluid material conduit converge via a conduit junction engaged with an inlet end of the treatment conduit; and (iii) the back pressure generator is engaged with an outlet end of the treatment conduit.

In a second embodiment, a subject system for providing expanded polymeric microspheres may comprise the apparatus of any of the first or subsequent embodiments and at least one batch tank to receive the expanded expandable polymeric microspheres. The system may comprise a plurality of batch tanks to receive the expanded polymeric microspheres. The at least one batch tank may comprise at least one mixing device.

In a third embodiment, a subject system for providing expanded polymeric microspheres may comprise the apparatus of any of the first or subsequent embodiments and at least one fluid material vessel in fluid communication with the fluid material conduit.

In a fourth embodiment, a subject system for providing expanded polymeric microspheres may comprise: (i) an apparatus for expanding a fluid material comprising unexpanded, expandable polymeric microspheres, the apparatus comprising: (a) a steam generator having a power output of less than or equal to about 6 boiler horsepower; (b) a steam conduit in fluid communication with the steam generator; (c) a fluid material conduit in fluid communication with a source of the fluid material; (d) a treatment zone in fluid communication with the steam generator via the steam conduit, and with the fluid material conduit, such that the fluid material is contacted by steam within the treatment zone; and (e) a back pressure generator in fluid communication with the treatment zone, capable of increasing pressure in the treatment zone, which results in expansion of the expandable polymeric microspheres when the fluid material exits the treatment zone; (ii) at least one fluid material vessel in fluid communication with the fluid material conduit; and (iii) at least one batch tank to receive the expanded expandable polymeric microspheres. The system may further comprise a site gauge engaged with the fluid material conduit. The system may further comprise a plurality of batch tanks to receive the expanded polymeric microspheres. The at least one batch tank may comprise at least one mixing device.

What is claimed is:

1. An apparatus comprising:
   a. a steam generator having a power output during steady-state operation of less than or equal to about 6 boiler horsepower;
   b. a steam conduit in fluid communication with the steam generator;
   c. a fluid material conduit in fluid communication with a source of a fluid material, wherein the fluid material comprises unexpanded, expandable polymeric microspheres;
   d. a treatment zone in fluid communication with the steam generator via the steam conduit, and with the fluid material conduit, such that the fluid material is contacted by steam within the treatment zone; and
   e. a back pressure generator in fluid communication with the treatment zone, capable of increasing pressure in the treatment zone, which results in expansion of the expandable polymeric microspheres when the fluid material exits the treatment zone.

2. The apparatus of claim 1, wherein the apparatus consumes less than or equal to about 70 kw during steady-state operation.

3. The apparatus of claim 1, wherein the apparatus has a footprint which allows the apparatus to be placed inside a manufacturing facility which uses the expanded expandable polymeric microspheres in products of manufacture without substantially adversely affecting production of the products of manufacture.

4. The apparatus of claim 3, wherein the footprint of the apparatus is less than or equal to about 60 ft$^2$.

5. The apparatus of claim 1, further comprising a manual and/or automatic site gauge engaged with the fluid material conduit.

6. The apparatus of claim 1, wherein the inside diameter of the fluid material conduit is from about 0.2 to about 1.5 inches.

7. The apparatus of claim 1, wherein the treatment zone comprises a treatment conduit.

8. The apparatus of claim 7, wherein the steam conduit and the fluid material conduit are joined via a conduit junction proximate to an inlet end of the treatment conduit.

9. The apparatus of claim 7, wherein the back pressure generator is engaged with an outlet end of the treatment conduit.

10. The apparatus of claim 1, wherein the temperature inside the treatment zone is from about 80° C. to about 160° C.

11. The apparatus of claim 1, wherein the pressure inside the treatment zone is from about 46.1 kPa to about 618.1 kPa.

12. The apparatus of claim 1, further comprising:
   f. a control device to manually and/or automatically control the function of the apparatus; and
   g. a manual and/or automatic site gauge engaged with the fluid material conduit;
   wherein:
   i. the treatment zone comprises a treatment conduit;
   ii. the steam conduit and the fluid material conduit converge via a conduit junction engaged with an inlet end of the treatment conduit; and
   iii. the back pressure generator is engaged with an outlet end of the treatment conduit.

13. A system for providing expanded polymeric microspheres comprising the apparatus of claim 1 and at least one batch tank to receive the expanded expandable polymeric microspheres, optionally wherein the at least one batch tank comprises at least one mixing device.

14. The system of claim 13, comprising a plurality of batch tanks to receive the expanded polymeric microspheres.

15. The apparatus of claim 1, wherein the back pressure generator comprises at least one of:
   (i) a length of conduit sufficient to impede flow through the treatment zone, such that the temperature and/or pressure inside the treatment zone are maintained or increased;
   (ii) a conduit which has an interior size which is smaller than the interior size of either or both of the fluid material conduit or the steam conduit, such that the temperature and/or pressure inside the treatment zone are maintained or increased; or
   (iii) a conduit which has an irregular interior wall pattern, optionally a rifled conduit, such that the temperature and/or pressure inside the treatment zone are maintained or increased.

16. The apparatus of claim 1, wherein the apparatus consumes less than or equal to about 45 kW during steady-state operation.

17. The apparatus of claim 7, wherein the steam conduit and the fluid material conduit are joined via a conduit junction engaged with an inlet end of the treatment conduit.

18. The apparatus of claim 1, wherein the temperature inside the treatment zone is from about 105° C. to about 145° C.

19. The apparatus of claim 1, wherein the pressure inside the treatment zone is from about 120 kPa to about 420 kPa.

* * * * *